(12) United States Patent
Oguri et al.

(10) Patent No.: US 6,579,636 B2
(45) Date of Patent: Jun. 17, 2003

(54) COATING HAVING HIGH RESISTANCE TO HEAT AND OXIDATION AND MULTI-COATED MATERIAL HAVING HIGH RESISTANCE TO HEAT AND OXIDATION

(75) Inventors: Kazuyuki Oguri, Nagoya (JP); Takahiro Sekigawa, Nagoya (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/949,707

(22) Filed: Sep. 12, 2001

(65) Prior Publication Data

US 2002/0032115 A1 Mar. 14, 2002

(30) Foreign Application Priority Data

Sep. 12, 2000 (JP) .......................... 2000-276767

(51) Int. Cl.[7] .............. B32B 9/00; C03C 14/00; C03C 3/06
(52) U.S. Cl. .............. 428/697; 428/408; 428/446; 428/701; 428/702; 501/65; 501/54; 501/32
(58) Field of Search .............. 501/65, 54, 32; 438/446, 697, 701

(56) References Cited

U.S. PATENT DOCUMENTS 4,863,773 A * 9/1989 Rousseau et al. .......... 428/68
5,547,904 A * 8/1996 Watzke et al. .............. 501/66
6,331,362 B1 * 12/2001 Dupel et al. ............... 428/689

FOREIGN PATENT DOCUMENTS

JP 6-48834 2/1994
JP 7-277861 10/1995

OTHER PUBLICATIONS

T. Yoshinaka, et al., "Oxidation Behavior of SiC Coated C/C Materials", Various Composite Materials 98, (Japan), pp. 581–584, No Date.

Nakai Kinjyo, et al., "Development of Super High Temperature, Oxidation Resistant, High Strength c/c Composite Material", Japan Composite Material Institue, vol. 19, No. 1, 1993, (Japan), pp. 32–34, No Month.

* cited by examiner

Primary Examiner—Deborah Jones
Assistant Examiner—G. A. Blackwell-Rudasill
(74) Attorney, Agent, or Firm—Oblon, Spivak, McClelland, Maier & Neustadt, P.C.

(57) ABSTRACT

A high temperature oxidation resistant coating performs a self-repairing function of self-repairing the cracks under a heated environment and has low catalytic properties. The high temperature oxidation resistant coating is prepared by dispersing silicate particles containing a composite oxide consisting of an oxide of a lanthanoide series rare earth element including yttrium and silicon oxide into a glass-based matrix.

13 Claims, 1 Drawing Sheet ic COATING HAVING HIGH RESISTANCE TO HEAT AND OXIDATION AND MULTI-COATED MATERIAL HAVING HIGH RESISTANCE TO HEAT AND OXIDATION

CROSS-REFERENCE TO RELATED APPLICATIONS

This application is based upon and claims the benefit of priority from the prior Japanese Patent Application No. 2000-276767, filed Sep. 12, 2000, the entire contents of which are incorporated herein by reference.

BACKGROUND OF THE INVENTION

1. Field of the Invention

The present invention relates to a coating having a high resistance to heat and oxidation and a multi-coated material having a high resistance to heat and oxidation, particularly to the above adapted for use in the manufacture of heat resistant structures such as bodies of space craft and next generation supersonic aircraft, engine parts and gas turbines.

2. Description of the Related Art

When a space craft reentries, a shock wave is generated at the nose tip portion of the body and the leading edge portion of the main wing which leads to high temperatures, with the result that oxygen molecules and nitrogen molecules within the air are dissociated into atomic states. If the dissociated atomic oxygen and nitrogen arrive at the surface of the space craft body, recombination occurs depending on the properties of the surface of the space craft body so as to be brought back to oxygen and nitrogen molecules. The recombination reaction is exothermic and, thus, the surface of the space craft body is heated by both the aerodynamic heating and the heat of the recombination reaction.

The term "catalytic properties" denotes the degree of the recombination reaction on the surface of the body of a space craft. The recombination reaction is unlikely to take place on the surface of a material having low catalytic properties and, thus, the temperature elevation on the surface of the space craft body can be suppressed if the above material is used. On the other hand, where the body of the space craft is formed of a material having high catalytic properties, the temperature on the surface of the space craft body is markedly increased because the recombination reaction easily takes place on the surface of the material having high catalytic properties. As a result, a temperature difference of several hundred degrees centigrade is generated between the materials having high and low catalytic properties. Incidentally, this particular phenomenon is inherent in the re-entering environment of space craft.

Vigorous research is being conducted in an attempt to develop a high performance heat resistant system capable of withstanding the aerodynamic heating environment at the time a space craft re-enters the atmosphere.

For example, Yoshinaka, Morino, M. A. Kurtz published various composite materials on page 581 of "Oxidation Behavior of SiC coated Carbon/Carbon Material" in the 36th Aircraft Symposium, '98" published by Japan Aircraft Space Institute. To be more specific Yoshinaka et. al. published in this symposium various composite materials including a first composite material prepared by forming a SiC layer on a carbon composite material (C/C matrix) by a conversion method, followed by further forming a SiC layer thereon by a CVD method, and a second composite material prepared by applying a $SiO_2/B_2O_3$ glass seal to the first composite material while clarifying the thermal-chemical erosion mechanism of the C/C matrix consisting of a carbon fiber having a SiC coating applied thereto and a carbon matrix.

Also Nakai, Kinjo, Matsuura, Maekawa, Yumidachi published Japan Composite Material Institute, on page 32 of "Development of Super High Temperature, Oxidation Resistant, High Strength C/C Composite Material" Vol. 19, No. 1, 1993. To be more specific, Nakai et. al. published in this Institute magazine a high temperature oxidation resistant material adapted for use in the manufacture of space craft i.e., the material prepared by forming a carbide layer containing silicon carbide as a main component on the surface of a carbonaceous material, followed by applying a crack seal of $SiO_2.B_2O_3$ glass material to the carbide layer. The high temperature oxidation resistant material disclosed in this literature exhibits an excellent resistance to oxidation under a high temperature of about 1600° C.

However, in the material disclosed in this literature, cracks are generated in the coating because of differences in the thermal expansion coefficient between the coating and the substrate. Also, even if the cracks of the coating are sealed by a glass-based sealing material, the cracks are opened and closed by heating and cooling which takes place when a space craft using the particular material reentries. As a result, the crack seal is thermal-chemically eroded, making it difficult to use the sealed material repeatedly.

On the other hand, Japanese Patent Disclosures (Kokai) Nos. 6-48834 and 7-277861 disclose a high temperature oxidation resistant material prepared by forming an intermediate member containing silicon carbide as a main component on the surface of a carbonaceous material, followed by covering the intermediate member with a composite oxide consisting of an oxide of a lanthanoide series rare earth element and silicon dioxide. The high temperature oxidation resistant material disclosed in these prior arts is superior in its resistance to oxidation at high temperatures over the material previously referred to, and is prepared by forming a carbide layer containing silicon carbide as a main component. To be more specific, the high temperature oxidation resistant material disclosed in the Japanese Patent documents referred to above exhibits an excellent resistance to oxidation under a high temperature of about 1700° C.

However, in the above high temperature oxidation resistant material cracks occur in the coating of the composite oxide because of differences in the thermal expansion coefficient between the coating and the substrate. Also, cracks are newly formed in the coating during use of the high temperature oxidation resistance material, as in that of the published literature previously referred to. In addition, the cracks are wider and longer. It follows that the cracks of the coating are not repaired.

Further, the composite oxide coating consisting of the oxide of the lanthanoide series rare earth element and silicon dioxide, which is formed on the surface of the high temperature oxidation resistant material, is certainly excellent in its resistance to oxidation under high temperatures. However, the composite oxide coating noted above tends to have the high catalytic properties referred to previously. As a result, the temperature of the space craft using the particular high temperature oxidation resistant material tends to be markedly elevated by the aerodynamic heating when the space craft reentries during its flight back to the earth.

BRIEF SUMMARY OF THE INVENTION

An object of the present invention is to provide a high temperature oxidation resistant coating composition having a self-repairing function of repairing by itself the cracks under a heating environment and having low catalytic properties.

Another object of the present invention is to provide a high temperature oxidation resistant multi-coated material comprising a high temperature oxidation resistant coating having a self-repairing function of repairing by itself the cracks under a heating environment and having low catalytic properties.

According to a first aspect of the present invention, there is provided a high temperature oxidation resistant coating composition, comprising a glass-based matrix and silicate particles containing a composite oxide consisting of an oxide of a lanthanide series rare earth element including yttrium, and silicon oxide, the silicate particles being dispersed in the glass-based matrix, wherein the weight ratio of said silicate particles to said glass-based matrix falls within a range of between 40:60 and 90:10.

Further, according to a second aspect of the present invention, there is provided a high temperature oxidation resistant multi-coated material, comprising:

a substrate;

an intermediate layer formed on the surface of the substrate and consisting of at least one ceramic material selected from the group consisting of silicon carbide, silicon nitride, silicon carbonitride, and silicon boride; and a high temperature oxidation resistant coating formed on the intermediate layer and prepared by dispersing silicate particles containing a composite oxide consisting of an oxide of a lanthanide series rare earth element including yttrium, and a silicon oxide in a glass-based matrix, wherein the weight ratio of said silicate particles to said glass-based matrix falls within a range of between 40:60 and 90:10.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A high temperature oxidation resistant coating composition of the present invention will now be described in detail.

The high temperature oxidation resistant coating composition of the present invention, i.e., a coating exhibiting a high resistance to oxidation under high temperatures, comprises a glass-based matrix and silicate particles containing a composite oxide consisting of an oxide of a lanthanide series rare earth element including yttrium, and silicon oxide, the silicate particles being dispersed in the glass-based matrix.

Figure 1:
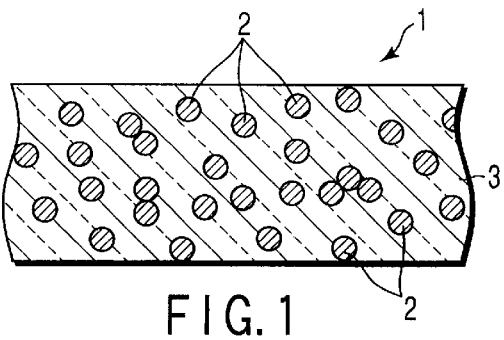
FIG. 1 is a cross sectional view schematically showing the construction of a heat temperature oxidation resistant coating of the present invention.
Figure 2:
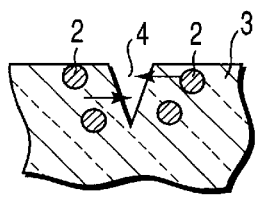
FIG. 2 is a cross sectional view schematically showing the self-repairing function performed by the high temperature oxidation resistant coating shown in FIG. 1.

To be more specific, the high temperature oxidation resistant coating 1 comprises a glass-based matrix 3 and a plurality of silicate particles 2 dispersed in the glass based matrix 3, as shown in FIG. 1.

The silicate particle noted above denotes a particle of the composite oxide alone or a particle containing the composite oxide and at most 50% by weight of a second component selected from the group consisting of carbide, nitride, boride and silicide.

It is desirable for the composite oxide to consist of an oxide of a lanthanide series rare earth element and $SiO_2$ mixed at a molar ratio falling within a range of between 70:30 and 30:70. The silicate particles containing the composite oxide of the particular composition exhibit a good compatibility with the glass-based matrix so as to improve the bonding strength to the matrix. It is also possible for the particular silicate particles to improve the heat resistance of the resultant high temperature oxidation resistant coating. If the mixing amount of the oxide of the lanthanide series rare earth element in the composite oxide exceeds 70 mol %, the thermal expansion coefficient of the silicate particles containing the composite oxide is increased so as to lower the compatibility of the silicate particles with the glass-based matrix, with the result that peeling tends to take place between the silicate particles and the matrix. On the other hand, if the mixing amount of the oxide of the lanthanide series rare earth element in the composite oxide is smaller than 30 mol %, the heat resistance of the silicate particles containing the composite oxide tends to be lowered. More desirably, the molar ratio of the oxide of the lanthanide series rare earth element to $SiO_2$ should fall within a range of between 40:60 and 60:40.

It is desirable for the silicate particles to have a particle diameter of 5 to 100 μm, preferably 10 to 50 μm.

It is desirable for the glass-based matrix to have a viscosity of $10^2$ to $10^{7.5}$ dPa·s during use under high temperatures i.e., under temperatures of 800 to 1700° C. If the viscosity of the glass-based matrix during use under high temperatures is less than $10^2$ dPa·s, the viscosity is unduly low, with the result that the coating tends to flow out during use under high temperatures. On the other hand, if the viscosity of the glass-based matrix during use under high temperatures exceeds $10^{7.5}$ dPa·s, the viscosity is unduly high, with the result that the coating is incapable of self repair. It is more desirable for the viscosity of the glass-based matrix during use under high temperatures to fall within a range of between $10^3$ and $10^6$ dPa·s.

To be more specific, the glass-based matrix is provided by a $SiO_2$—$B_2O_3$-based glass. It is acceptable for the $SiO_2$—$B_2O_3$-based glass to contain $Al_2O_3$. Particularly, it is desirable for the glass-based matrix to consist of 75 to 95% by weight of $SiO_2$, 5 to 25% by weight of $B_2O_3$, and 0 to 5% by weight of $Al_2O_3$. If the mixing amount of $SiO_2$ exceeds 95% by weight, and the mixing amount of $B_2O_3$ is smaller than 5% by weight, the self-repairing performance is lowered, resulting in failure to obtain the desired effect, though it is certainly possible to improve the heat resistance of the high temperature oxidation resistant coating. On the other hand, if the mixing amount of $SiO_2$ is less than 75% by weight and the mixing amount of $B_2O_3$ exceeds 25% by weight, the heat resistance is lowered, resulting in failure to obtain the desired effect, though it is certainly possible to improve the self-repairing performance of the high temperature oxidation resistant coating. Further, it is possible to improve the heat resistance of the high temperature oxidation resistant coating by adding $Al_2O_3$. It is more desirable for the glass-based matrix to consist of 85 to 90% by weight of $SiO_2$, 10 to 15% by weight of $B_2O_3$, and 1 to 3% by weight of $Al_2O_3$.

It is desirable for the mixing ratio of the silicate particles to the glass-based matrix to fall within a range of between 40:60 and 90:10 by weight. If the mixing ratio of the silicate particles is less than 40 by weight, the mixing ratio of the glass-based matrix is rendered relatively high, with the result that the high temperature oxidation resistant coating tends to flow out under high temperature. On the other hand, if the mixing ratio of the silicate particles exceeds 90 by weight, the self-repairing performance of the high temperature oxidation resistant coating tends to be lowered. It is more desirable for the mixing ratio of the silicate particles to the glass-based matrix to fall within a range of between 60:40 and 85:15 by weight.

The high temperature oxidation resistant coating of the present invention described above is constructed such that the silicate particles containing the composite oxide consisting of an oxide of a lanthanide series rare earth element and silicon oxide are dispersed in the glass-based matrix.

The high temperature oxidation resistant coating having this particular construction has a self-repairing performance for repairing the cracks present in advance under a high temperature environment. To be more specific, if the high temperature oxidation resistant coating 1, in which a crack 4 is present is exposed to a high temperature environment, the glass-based matrix becomes plastic so as to repair the crack 4. As a result, where the high temperature oxidation resistant coating of the present invention is applied to, for example, a space craft, the cracks generated previously can be repaired by the heat generated when the space craft reentries.

It should also be noted that the cracks present in the coating can be easily repaired by applying a heat treatment as required before the high temperature oxidation resistant coating of the present invention is actually used.

Further, where the high temperature oxidation resistant coating of the present invention, i.e., the coating exhibiting a high resistance to oxidation under high temperatures, is applied to, for example, a space craft, the glass-based matrix is melted by the heat generated when the space craft reentries so as to cover the surface, with the result that low catalytic properties can be obtained. As a result, it is possible to suppress the temperature elevation on the surface of the space craft. It follows that the space craft having the high temperature oxidation resistant coating of the present invention applied thereto exhibits an excellent durability.

Incidentally, the high temperature oxidation resistant coating of the present invention can also be applied to, for example, the body of next generation supersonic aircraft and the heat resistant structures of engine parts and gas turbines as well as to space craft, so as to improve the durability of heat resistant structures.

The high temperature oxidation resistant multi-coated material of the present invention will now be described In detail.

The high temperature oxidation resistant multi-coated material of the present invention comprises a substrate, an intermediate layer formed on the substrate and consisting of at least one ceramic material selected from the group consisting of silicon carbide, silicon nitride, silicon carbonitride and silicon boride, and a high temperature oxidation resistant coating formed on the intermediate layer and prepared by dispersing silicate particles, which contains a composite oxide consisting of an oxide of the lanthanide series rare earth element including yttrium, and silicon oxide, into a glass-based matrix.

Figure 3:
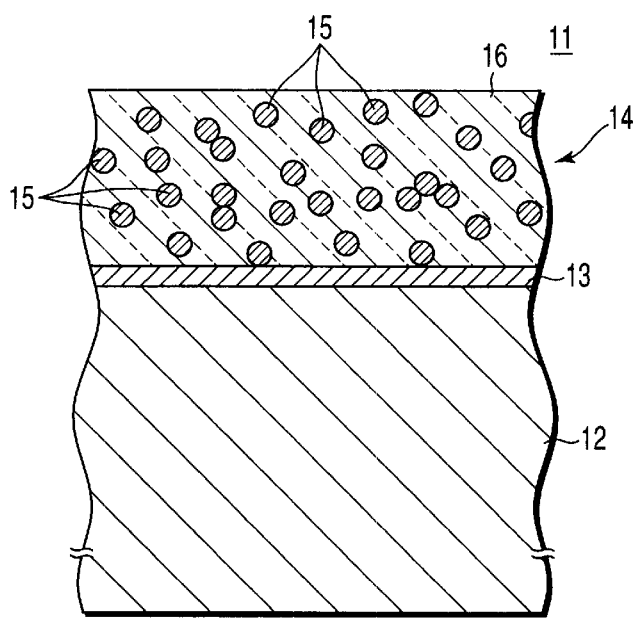
FIG. 3 is a cross sectional view of a multi-coated material including a high temperature oxidation resistant coating of the present invention.

To be more specific, the high temperature oxidation resistant multi-coated material 11 of the present invention comprises a substrate 12, an intermediate layer 13 formed on the surface of the substrate 12, and a high temperature oxidation resistant coating 14, which has the composition as described previously, formed on the surface of the intermediate layer 13 as shown in FIG. 3. To reiterate, the high temperature oxidation resistant coating 14 is prepared by dispersing the silicate particles 15 into the glass-based matrix 16.

The substrate 12 is selected from the group consisting of, for example, a carbon composite material consisting of a carbon fiber and a carbon matrix (C/C substrate), a composite material consisting of a carbon fiber and a SiC matrix (C/SiC substrate), a composite material consisting of a SiC fiber and a SiC matrix (SiC/SiC substrate), and graphite.

The intermediate layer plays the role of allowing the high temperature oxidation resistant coating to be bonded satisfactorily to the substrate. The intermediate layer can be formed on the surface of the substrate by a conversion method or a CVD method. It is desirable for the intermediate layer to have a thickness falling within a range of between 5 and 200 $\mu$m, preferably between 10 and 100 $\mu$m. If the thickness of the intermediate layer is less than 5 $\mu$m, the intermediate layer possibly fails to cover the entire surface of the substrate. On the other hand, if the thickness of the intermediate layer exceeds 200 $\mu$m, the intermediate layer tends to be peeled or cracked by thermal shock.

In the high temperature oxidation resistant coating, it is possible to set 1) the composition of the silicate particles, 2) the composition of the composite oxide contained in the silicate particles, 3) the particle diameter of the silicate particles, 4) the properties and the composition of the glass-based matrix, and 5) the mixing ratio of the silicate particles to the glass-based matrix as described previously in conjunction with the high temperature oxidation resistant coating of the present invention.

The high temperature oxidation resistant coating described above can be formed on the surface of the intermediate layer formed on the substrate, for example, as follows. In the first step, a coating liquid is prepared by dispersing the silicate particles and the glass-based matrix in an adhesive solution, e.g., an adhesive aqueous solution. The adhesive used in this step includes, for example, carboxymethyl cellulose. Then, after the surface of the intermediate layer formed on the substrate is coated with the coating liquid thus prepared, the coating is dried and, then, subjected to a heat treatment so as to form a high temperature oxidation resistant coating on the surface of the intermediate layer. For the coating treatment, it is possible to employ, for example, a brush coating method, a spray coating method or a dipping method, though the coating means is not limited to those exemplified above. It is desirable to carry out the heat treatment noted above under an inert gas atmosphere such as an argon gas atmosphere at 1000 to 1600° C. for 30 to 300 minutes, preferably at 1200 to 1500° C. for 60 to 120 minutes.

As a method for forming the high temperature oxidation resistant coating, it is also possible to employ the sol-gel calcining method and the flame spraying calcining method in addition to the slurry coating calcining method described above.

It is desirable for the high temperature oxidation resistant coating to have a thickness falling within a range of between 50 and 1000 $\mu$m. If the thickness of the high temperature oxidation resistant coating is less than 50 $\mu$m, the durability of the coating tends to be lowered. On the other hand, if the thickness of the high temperature oxidation resistant coating exceeds 1000 $\mu$m, the coating tends to peel off. It is more desirable for the thickness of the high temperature oxidation resistance coating to fall within a range of between 100 and 500 $\mu$m.

The high temperature oxidation resistance multi-coated material of the present invention described above comprises a substrate, an intermediate layer formed on the surface of the substrate and consisting of at least one ceramic material selected from the group consisting of silicon carbide, silicon nitride, silicon carbonitride and silicon boride, and a high temperature oxidation resistant coating formed on the surface of the intermediate layer and prepared by dispersing silica particles, which contain a composite oxide consisting of an oxide of a lanthanide series rare earth element and silicon oxide, into a glass-based matrix.

In the high temperature oxidation resistant multi-coated material of this particular construction, the intermediate layer consisting of a predetermined ceramic material permits the high temperature oxidation resistant coating to be strongly bonded to the substrate.

Figure 4:
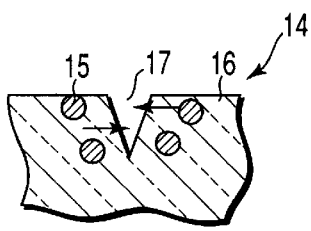
FIG. 4 is a cross sectional view schematically showing the self-repairing function performed by the multi-coated material shown in FIG. 3.

It should also be noted that the high temperature oxidation resistant multi-coated material of the present invention produces the self-repairing performance that the uppermost high temperature oxidation resistant coating repairs the cracks generated previously under a high temperature environment. To be more specific, if the high temperature oxidation resistant coating 14 has a crack 17 generated in advance, and is exposed to a high temperature environment, the glass-based matrix 16 is fluidized so as to repair the crack 17, as shown in FIG. 4. As the result, where the high temperature oxidation resistant multi-coated material of the present invention is incorporated in, for example, a space craft, the cracks generated in advance in the uppermost high temperature oxidation resistant coating can be repaired by the heat generated when the space craft reentries.

Further, cracks generated in the uppermost high temperature oxidation resistant coating can be repaired easily by applying a heat treatment at, for example, 800 to 1600° C. to the high temperature oxidation resistant multi-coated material of the present invention before use of the multi-coated material. It is possible to control the heating temperature in repairing the cracks depending on the composition of the glass-based matrix included in the high temperature oxidation resistant coating. For example, where the glass-based matrix is formed of a $SiO_2$—$B_2O_3$ series glass, it is possible to repair the cracks noted above by heating under a relatively low temperature in the case of increasing the content of $B_2O_3$ in the glass composition.

Further, where the high temperature oxidation resistant multi-coated material of the present invention is applied to, for example, a space craft, the glass-based matrix of the high temperature oxidation resistant coating constituting the uppermost surface of the multi-coated material is melted by the heat generated when the space craft reentries so as to cover the surface, with the result that low catalytic properties can be developed. It follows that it is possible to suppress the temperature elevation of the surface of the space craft, leading to a high durability of the space craft.

Incidentally, the high temperature oxidation resistant multi-coated material of the present invention can be applied to, for example, the body of next generation supersonic aircraft and the heat resistant structures of engine parts and gas turbines as well as to space craft so as to improve the durability of heat resistant structures.

Preferred embodiments of the present invention will now be described in detail.

EXAMPLE 1

Prepared were a $Y_2SiO_5$ powder having a particle diameter not larger than 10 $\mu$m and a glass powder having a ratio of $SiO_2$:$B_2O_3$:$Al_2O_3$ of 85:13:2, by weight, and having particle diameter not larger than 50 $\mu$m. These $Y_2SiO_5$ powder and glass powder were mixed at a mixing ratio by weight of 70:30. The mixing was performed for 20 minutes, followed by preparing a sufficient slurry by mixing the resultant mixture together with an aqueous solution of carboxymethyl cellulose having a concentration of 2% by weight.

In the next step, a SiC layer having a thickness of 30 $\mu$m was formed as an intermediate layer by the conversion method on the surface of a C/C substrate formed of a carbon composite material consisting of a carbon fiber and a carbon matrix, followed by coating the surface of the SiC layer (intermediate layer) with the slurry noted above with a brush and subsequently drying the coating at 100° C. for 1 hour. The coating and the drying were repeated three times so as to form a coating having a thickness of 210 $\mu$m on the SiC layer (intermediate layer). Then, the coating was sintered at 1300° C. for 60 minutes within a sintering furnace filled with an argon gas atmosphere, thereby obtaining the high temperature oxidation resistant multi-coated material constructed as shown in FIG. 3. It has been found that a high temperature oxidation resistant coating, in which the yttrium silicate particles were uniformly dispersed in the glass matrix, was formed in a thickness of 200 $\mu$m on the uppermost surface of the multi-coated material. It has also been found that cracks were not generated in the high temperature oxidation resistant coating.

A plasma heat resistance durability test and a self-repairing test were applied to the multi-coated material obtained in Example 1 as follows so as to evaluate the properties of the multi-coated material.

1) Plasma Heat Resistance Durability Test

The multi-coated material was set in a plasma wind tunnel apparatus, and plasma heating was applied to the multi-coated material at a heating rate of 1555 kW/m$^2$. The temperature of the multi-coated material was rendered substantially constant at 1600° C. Under this condition, the heat resistance durability test was conducted for 20 minutes, with the result that the multi-coated material was thermal-chemically eroded by 10 $\mu$m in thickness.

Also, a heat resistance durability test at 1400° C. for 20 minutes, which was conducted by a plasma heating with a rated heating rate of 1000 kW/m², was repeated 5 times by using another multi-coated material prepared by a method similar to that of Example 1. The total amount of the multi-coated material which is thermal-chemically eroded was found to be only 20 μm, and no particular damage was found.

2) Self Repairing Test

A sample for a self-repairing test was prepared by making a hole having a diameter of 1 mm and a depth of 100 μm in the multi-coated material referred to above. The sample thus prepared was set in a plasma wind tunnel apparatus and heated at 1300° C. for 20 minutes under a heating rate of 900 kW/m². As a result, the hole of the sample was closed up. In other words, self-repair was achieved because the glass component around the hole was fluidized.

Comparative Example 1

A SiC layer was formed in a thickness of 100 μm on the surface of a C/C substrate by a conversion method, followed by forming a uniform coating consisting of $Y_2SiO_5$ in a thickness of 100 μm on the surface of the SiC layer by a flame spraying method, thereby obtaining a high temperature oxidation resistant multi-coated material. Cracks were found to have been generated in a part of the surface coating of the high temperature oxidation resistant multi-coated material.

A plasma heat resistance durability test, a catalytic property test of the surface coating and a self-repairing test were conducted for the resultant multi-coated material of Comparative Example 1 as follows so as to evaluate the properties of the multi-coated material.

1) Plasma Heat Resistance Durability Test

The multi-coated material was set in a plasma wind tunnel apparatus, and the plasma conditions were adjusted so as to heat the multi-coated material to 1600° C. as in Example 1 under a heating rate of 800 kW/m². As a result, the multi-coated material was thermal-chemically eroded by 5 μm in thickness, which was less than that of the multi-coated material of Example 1.

However, since the temperature of the multi-coated material was elevated to 1600° C. with the plasma output of the heating rate of 800 kW/m², which was lower than that in Example 1, in the heat resistance durability test, the test was conducted separately with the plasma output equal to that in Example 1, i.e., under the rated heating rate of 1555 kW/m². As a result, the multi-coated material was rapidly heated to a temperature not lower than 1700° C. so as to bring about damage to the coating. Therefore, the test was stopped.

2) Catalytic Properties Test of the Coating

The catalytic properties of the coating on the surface of the multi-coated material were examined separately by using a plasma wind tunnel apparatus. As a result, the multi-coated material of Comparative Example 1 exhibited a catalyst recombination rate constant, which denotes the degree of catalytic properties, of tens to hundreds of meters per second in contrast to 2 to 5 m/s for the multi-coated material of Example 1, supporting the finding that the multi-coated material in Comparative Example 1 tends to exhibit high catalytic properties. In other words, it has been clarified that the temperature elevation in the multi-coated material of Comparative Example 1 when the test was conducted under wind tunnel conditions equal to those in Example 1 was due to high catalytic properties.

3) Self-repairing Test

A sample for the self-repairing test was prepared by making a hole having a diameter of 1 mm and a depth of 50 μm in the multi-coated material. The sample thus prepared was set in a plasma wind tunnel apparatus and heated at 1300° C. for 20 minutes. As a result, no change was recognized in the hole made in the sample. In other words, the self-repairing performance was not recognized.

Comparative Example 2

Figure 5:
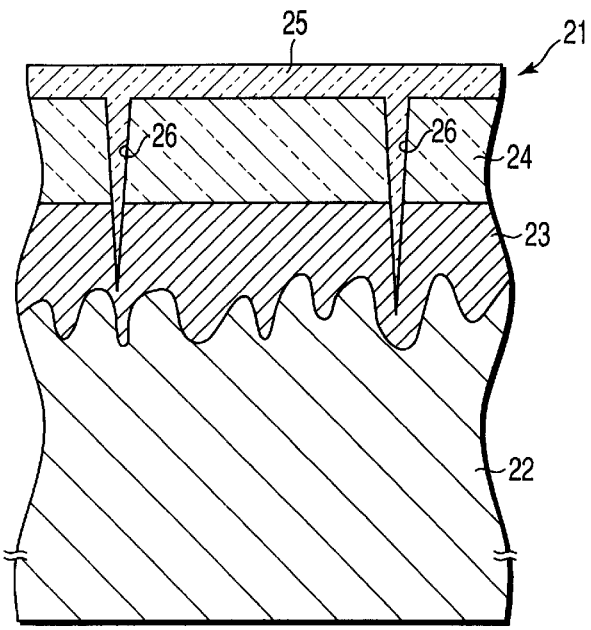
FIG. 5 is a cross sectional view schematically showing the construction of the multi-coated material according to Comparative Example 2.

After a SiC layer was formed in a thickness of 100 μm on the surface of a C/C substrate by a conversion method, a SiC coating was formed by a CVD method in a thickness of 100 μm on the surface of the SiC layer thus formed. Cracks occurred in the SiC coating step. In order to seal these cracks, a $SiO_2$—$B_2O_3$ glass coating containing 25 mol % of $B_2O_3$ was formed in a thickness of 2 to 3 μm on the surface of the SiC coating by a sol-gel method so as to prepare the high temperature oxidation resistant multi-coated material 21 shown in FIG. 5. As shown in FIG. 5, the high temperature oxidation resistant multi-coated material 21 was prepared by forming the SiC layer 23 and the SiC coating 24 in the order mentioned on the surface of the C/C substrate 22, followed by forming the glass coating 25 on the surface of the SiC coating 24 in a manner to seal the cracks 26.

A plasma heat resistance durability test and a self-repairing performance test were applied as follows to the resultant multi-coated material of Comparative Example 2 so as to evaluate the properties of the multi-coated material.

1) Plasma Heat Resistance Durability Test

The multi-coated material was set in a plasma wind tunnel apparatus and the temperature of the multi-coated material was maintained at 1600° C. by plasma heating so as to carry out the heat resistance durability test for 20 minutes. As a result, the multi-coated material was thermal-chemically eroded by 10 μm in thickness, which was equal to that of Example 1. Incidentally, the plasma output was substantially equal to that of Example 1.

Also a heat resistance durability test at 1400° C. for 20 minutes, which was conducted by plasma heating, was repeated 5 times by using another multi-coated material prepared by a method similar to that of Comparative Example 2. As a result, the C/C substrate was found to have been locally oxidized and thermal-chemically eroded at several points. It is considered reasonable to understand that the crack seal was thermal-chemically eroded by repeated heating, with the result that oxygen permeated through the open cracks so as to oxidize and thermal-chemically erode the substrate.

2) Self Repairing Test

A sample for a self-repairing test was prepared by making a hole having a diameter of 1 mm and a depth of 100 μm in the multi-coated material referred to above. The sample thus prepared was set in a plasma wind tunnel apparatus and heated at 1300° C. for 20 minutes. As a result, the hole of the sample was found not to have been changed at all. In other words, the self-repairing performance was not recognized.

As described above, the present invention provides a high temperature oxidation resistant coating and a high temperature oxidation resistant multi-coated material excellent in their self-repairing performances for self-repairing the cracks under a heated environment, having low catalytic properties, and adapted for use in the manufacture of space craft bodies and next generation supersonic aircraft and heat resistant structures such engine parts and gas turbines.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A high temperature oxidation resistant coating composition, comprising a glass-based matrix and silicate particles containing a composite oxide consisting of an oxide of a lanthanide series rare earth element including yttrium, and silicon oxide, said silicate particles being dispersed in said glass-based matrix, wherein the weight ratio of said silicate particles to said glass-based matrix falls within a range of between 40:60 and 90:10.

2. The high temperature oxidation resistant coating composition according to claim 1, wherein said glass-based matrix has a viscosity falling within a range of between $10^2$ and $10^{7.5}$ dPa·s during use under high temperatures.

3. The high temperature oxidation resistant coating composition according to claim 1 or 2, wherein said glass-based matrix consists of a $SiO_2$—$B_2O_3$ based glass.

4. The high temperature oxidation resistant coating composition according to claim 3, wherein said glass-based matrix contains 75 to 95% by weight of $SiO_2$, 5 to 25% by weight of $B_2O_3$ and 0 to 5% by weight of $Al_2O_3$.

5. The high temperature oxidation resistant coating composition according to claim 1, wherein said composite oxide contains 60 to 90% by weight of an oxide of a lanthanide series rare earth element including yttrium, and 40 to 10% by weight of $SiO_2$.

6. A high temperature oxidation resistant multi-coated material, comprising:

a substrate;

an intermediate layer formed on the surface of the substrate and consisting of at least one ceramic material selected from the group consisting of silicon carbide, silicon nitride, silicon carbonitride, and silicon boride; and a high temperature oxidation resistant coating formed on said intermediate layer and prepared by dispersing silicate particles containing a composite oxide consisting of an oxide of a lanthanide series rare earth element including yttrium, and a silicon oxide in a glass-based matrix, wherein the weight ratio of said silicate particles to said glass-based matrix falls within a range of between 40:60 and 90:10.

7. The high temperature oxidation resistant multi-coated material according to claim 6, wherein said glass-based matrix has a viscosity falling within a range of between $10^2$ and $10^{7.5}$ dPa·s during use under high temperatures.

8. The high temperature oxidation resistant multi-coated material according to claim 6 or 7, wherein said glass-based matrix consists of a $SiO_2$—$B_2O_3$ based glass.

9. The high temperature oxidation resistant multi-coated material according to claim 8, wherein said glass-based matrix contains 75 to 95% by weight of $SiO_2$, 5 to 25% by weight of $B_2O_3$ and 0 to 5% by weight of $Al_2O_3$.

10. The high temperature oxidation resistant multi-coated material according to claim 6, wherein said composite oxide contains 60 to 90% by weight of an oxide of a lanthanide series rare earth element including yttrium, and 40 to 10% by weight of $SiO_2$.

11. The high temperature oxidation resistant multi-coated material according to claim 6, wherein said intermediate layer has a thickness of 5 to 200 μm.

12. The high temperature oxidation resistant multi-coated material according to claim 6, wherein said high temperature oxidation resistant coating has a thickness of 50 to 1000 μm.

13. The high temperature oxidation resistant multi-coated material according to claim 6, wherein said substrate is made of a material selected from the group consisting of a carbon composite material consisting of a carbon fiber and a carbon matrix, a composite material consisting of a carbon fiber and a SiC matrix, a composite material consisting of a SiC fiber and a SiC matrix, and graphite.

* * * * *